United States Patent
Zhou (10) Patent No.: US 10,237,410 B1
(45) Date of Patent: Mar. 19, 2019

(54) HANDLING DECLINED CALLS FOR ALTERNATE PHONE NUMBER ON MOBILE DEVICE

(71) Applicant: Pinger, Inc., San Jose, CA (US)

(72) Inventor: Bin Zhou, San Jose, CA (US)

(73) Assignee: Pinger, Inc., San Jose, CA (US)

( * ) Notice: Subject to any disclaimer, the term of this patent is extended or adjusted under 35 U.S.C. 154(b) by 0 days.

(21) Appl. No.: 15/582,469

(22) Filed: Apr. 28, 2017

(51) Int. Cl.
  *H04M 3/533* (2006.01)
  *H04W 80/12* (2009.01)
  *H04M 3/54* (2006.01)
  *H04L 29/12* (2006.01)
  *H04M 3/22* (2006.01)

(52) U.S. Cl.
  CPC .... *H04M 3/53308* (2013.01); *H04L 61/1588* (2013.01); *H04M 3/2272* (2013.01); *H04M 3/543* (2013.01); *H04W 80/12* (2013.01)

(58) Field of Classification Search
  CPC ........... H04M 3/53308; H04M 3/2272; H04M 3/543; H04L 61/1588; H04W 80/12
  USPC ...................................... 455/422.1, 411–415
  See application file for complete search history.

(56) References Cited

U.S. PATENT DOCUMENTS

| | | | |
|---|---|---|---|
| 5,141,556 A | 8/1992 | Matrick | |
| 7,046,783 B1 | 5/2006 | Bosik et al. | |
| 7,912,497 B2 | 3/2011 | Isidore et al. | |
| 7,929,955 B1 | 4/2011 | Bonner | |
| 8,010,152 B2 | 8/2011 | Kim | |
| 8,270,577 B2 * | 9/2012 | Hao | H04M 3/53325 379/88.18 |
| 2002/0194331 A1 * | 12/2002 | Lewis | G06Q 20/10 709/224 |
| 2003/0147519 A1 | 8/2003 | Jain et al. | |
| 2004/0202300 A1 * | 10/2004 | Cooper | H04M 1/72583 379/201.01 |
| 2004/0215845 A1 | 10/2004 | Davani et al. | |
| 2005/0037746 A1 * | 2/2005 | Ramalho | H04W 88/02 455/422.1 |
| 2005/0129003 A1 | 6/2005 | Raeder et al. | |
| 2005/0238157 A1 | 10/2005 | Shaffer et al. | |
| 2006/0141981 A1 | 6/2006 | Lin | |
| 2006/0234693 A1 * | 10/2006 | Isidore | H04M 1/72519 455/422.1 |

(Continued)

OTHER PUBLICATIONS

BusinessCall, "A Second line for your smart phone is here", pp. 1-8 (retrieved on Sep. 28, 2016 from http://gobusinesscall.com/).

(Continued)

*Primary Examiner* — Nathan S Taylor
(74) *Attorney, Agent, or Firm* — Raubvogel Law Office (57) ABSTRACT

According to various embodiments, declined (or unanswered) calls to an alternate number on a mobile device can be handled differently than declined calls to the device's native phone number. For example, such declined (or unanswered) calls to an alternate number can be sent to a different voicemail system than the primary voicemail system associated with the device's native voice call functionality. The techniques described herein can be applied to any situation in which a call is declined or otherwise disposed of, including, for example: the recipient failing to answer the call; the device being in airplane mode; a "do not disturb" setting preventing acceptance of the call; or the like.

54 Claims, 6 Drawing Sheets

(56) References Cited

U.S. PATENT DOCUMENTS

| | | |
|---|---|---|
| 2006/0245391 A1 | 11/2006 | Vaidya et al. |
| 2007/0121863 A1 | 5/2007 | Nagel et al. |
| 2007/0213050 A1* | 9/2007 | Jiang ................ H04W 8/04 |
| | | 455/432.3 |
| 2008/0159502 A1 | 7/2008 | Venkatesulu et al. |
| 2008/0242270 A1* | 10/2008 | Marui ............... H04M 1/72519 |
| | | 455/413 |
| 2010/0020952 A1 | 1/2010 | Leung et al. |
| 2010/0081460 A1* | 4/2010 | Knight ................ H04L 12/6418 |
| | | 455/461 |
| 2010/0128857 A1* | 5/2010 | Logan ............... H04M 3/42229 |
| | | 379/88.22 |
| 2010/0159946 A1 | 6/2010 | Cheung et al. |
| 2011/0294472 A1 | 12/2011 | Bramwell et al. |
| 2011/0306330 A1 | 12/2011 | Sharp et al. |
| 2012/0033610 A1* | 2/2012 | Ring .................... H04L 67/141 |
| | | 370/328 |
| 2013/0254364 A1 | 9/2013 | Moganti et al. |
| 2013/0322612 A1 | 12/2013 | Petrack et al. |
| 2013/0337802 A1 | 12/2013 | Marken et al. |
| 2014/0179309 A1* | 6/2014 | Eichen ................ H04L 65/1016 |
| | | 455/433 |
| 2014/0282095 A1 | 9/2014 | Walters et al. |
| 2015/0350399 A1 | 12/2015 | Feller |
| 2015/0363721 A1 | 12/2015 | Kadosh et al. |
| 2016/0080935 A1* | 3/2016 | Tonogai ............. H04W 60/005 |
| | | 455/411 |
| 2016/0100051 A1 | 4/2016 | Yliaho |
| 2016/0345150 A1* | 11/2016 | Shim ...................... H04W 4/90 |
| 2016/0381225 A1* | 12/2016 | Messenger ...... H04M 1/274533 |
| | | 455/415 |
| 2016/0381226 A1* | 12/2016 | Messenger ...... H04M 1/274533 |
| | | 455/413 |
| 2016/0381231 A1* | 12/2016 | Messenger ...... H04M 1/274533 |
| | | 455/406 |
| 2017/0041461 A1 | 2/2017 | Sauln et al. |

OTHER PUBLICATIONS

U.S. Appl. No. 15/200,974 entitled "Multiple Phone Numbers for Mobile Device", filed Jul. 1, 2016.

* cited by examiner

HANDLING DECLINED CALLS FOR ALTERNATE PHONE NUMBER ON MOBILE DEVICE

CROSS-REFERENCE TO RELATED APPLICATION

The present application is related to U.S. Utility application Ser. No. 15/200,974 for "Multiple Phone Numbers for Mobile Device", filed on Jul. 1, 2016, which is incorporated herein by reference.

FIELD

The present application relates to mobile devices such as mobile telephones, and infrastructure for supporting same.

DESCRIPTION OF THE RELATED ART

Related U.S. Utility application Ser. No. 15/200,974 for "Multiple Phone Numbers for Mobile Device" describes techniques by which a user can receive voice calls using multiple phone numbers on a mobile device such as a smartphone, without any requirement for a second SIM card. The voice calls can be carried via the wireless carrier associated with the mobile device, using the device's normal allowance for voice calls, without the need to use large amounts of data. In addition, as described in the related application, in at least one embodiment, incoming voice calls are accurately identified as having been made to either the registered number for the device or an alternate number. In addition, in at least one embodiment, when a voice call is received at a device, the phone number, name, and/or other contact information for the originator of the call is/are provided to the user of the device.

As described in the related application, voice calls to alternate numbers are received at a server and forwarded to the receiving device; when forwarded, such calls are configured so that they appear to come from a "pilot number" associated with the server. The call is made to the receiving device using the native calling functionality of the receiving device; in this way, the normal voice calling functionality of the device can be used, without using large amounts of data as in Voice Over Internet Protocol (VoIP) calling apps.

SUMMARY

One consequence of the use of the device's native calling functionality to handle calls to the alternate number is that, if the recipient declines a call, (for example by pressing a "decline" button on the mobile device when the call is received), the declined call is handled as would a normal call to the native number associated with the recipient's device. Typically, this means that the call is transferred to the native voicemail system associated with the wireless carrier. In many cases this is undesirable, since the recipient may prefer that declined (or unanswered) calls to the alternate number be handled differently than declined calls to the device's native phone number. For example, it may be desirable to send such declined (or unanswered) calls to an alternate number to a different voicemail system than the primary voicemail system associated with the device's native voice call functionality, so that the calling party hears a different greeting depending on which number was called. Additionally, the recipient may prefer that voicemail messages associated with the two numbers be segregated from one another, for example if one number is for work calls and the other is for personal calls.

The techniques described herein address this issue, by allowing declined (or unanswered) calls to the alternate number to be handled by a different voicemail system than the primary voicemail system associated with the recipient device's native voice call functionality. More generally, techniques are described whereby declined calls to the alternate phone number can be handled differently than declined calls to the device's native phone number. The techniques described herein can be applied to any situation in which a call is declined or otherwise disposed of, including, for example: the recipient failing to answer the call; the device being in airplane mode; a "do not disturb" setting preventing acceptance of the call; or the like.

In at least one embodiment, the system makes use of application programming interfaces (APIs) that are designed for use with Voice over Internet Protocol (VoIP) calling apps. Generally, such APIs provide the ability to observe the recipient user's behavior in connection with incoming calls, so that the VoIP calling app can avoid conflicts with native calls. The system described herein uses such APIs in a different way: It observes the recipient user's behavior so as to be able to determine that a call to an alternate number has been declined; appropriate signals can then be sent to ensure that the declined call is handled properly.

In the context of the techniques described in the above-referenced related application, such information regarding the recipient user's behavior can be used, for example, to ensure that the declined call is sent to the appropriate voicemail system for the alternate number, or is otherwise handled in a manner distinct from declined calls to the native phone number of the device. However, since the functionality described in the above-referenced related application is implemented using native call functionality rather than VoIP, the app may be in a suspended state (or may not be running) when native calls (i.e., calls to the device's native number) are received at the recipient device. This includes calls to the alternate number, since, as described in the above-referenced related application, calls to the alternate number are still handled using the native voice call functionality of the device. Since the app may be suspended when such calls are received, the app would not normally be available to access the appropriate API when the call comes in, and thereby observe the user's behavior with the respect to the call.

More particularly, in some operating systems for mobile devices, the app may not be running (either in foreground or background) when the incoming call is received, so that the app would only see system callbacks after it resumes running. In such a situation, the app is not able to properly handle a declined call in real-time, and there is a possibility the declined call will be sent to the native voicemail handling mechanisms of the device, rather than being sent to a voicemail handling system associated with the called alternate number.

The techniques described herein provide a way to address this issue. As described in the above-referenced related application, in at least one embodiment, when a call to the alternate number is made, the central server sends a push notification (or some other form of notification) to the recipient device to alert the device that a call is coming in. The notification can be sent via any suitable mechanism, such as a data channel, Apple Push Notification Service (APNS), Google Cloud Messaging (GCM), Short Message Service (SMS) channel, or the like. The related application describes various ways in which this notification can be used by the recipient device, for example to alter contact records and perform other operations so that fields and/or images in the contact record for the pilot number indicate the use of an alternate number, and further indicate the identity of the caller.

According to various embodiments of the system described herein, the payload of the push notification can be used to activate, or "wake up", the app at the recipient device before the call is received. Once activated in this manner, the app can run the APIs that allow the device to observe the recipient's behavior with respect to incoming calls, and thereby detect state changes that indicate the recipient's behavior with respect to the incoming call, such as activation of a decline button. Once such behavior is determined, the call can be handled as appropriate; in particular, it can be sent to a different voicemail system than is used for calls to the native phone number. Alternatively, any other suitable handling can take place in response to detection of the call being declined.

In at least one embodiment, the techniques described herein are implemented using an app installed on the user's device. In at least one embodiment, the system also includes a central server that is able to send messages to the receiving user's device via a low power data channel, and is also able to forward voice calls to the user's device via a wireless carrier. Voice calls to alternate numbers are received at the central server and forwarded to the user's device; when forwarded, such calls are configured so that they appear to come from a "pilot number" associated with the central server.

As described in more detail below and in the above-referenced related application, just prior to forwarding a call to the user's device, the central server sends a message alerting the app installed on the device that a forwarded call is coming in. This message causes the app to be activated, so that it can then detect state changes that indicate the recipient user's behavior in connection with the incoming call. In particular, as described in more detail herein, the call can be redirected and/or handled as appropriate if the recipient user declines the call. As described in the above-referenced related application, upon receiving the message, the app can also perform other functions, such as automatically altering the pilot number contact record on the device so as to indicate the alternate number and also indicate the identity of the caller.

Further details and variations are described herein.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

The various concepts, architectures, methods, and modes of operation described herein are intended as illustrative examples that can be implemented singly or in any suitable combination with one another. Some may be omitted and others included, as suitable for various embodiments. Accordingly, the following description and accompanying Figures merely set forth a subset of the possible embodiments, and are not intended to limit scope.

System Architecture

According to various embodiments, the techniques described herein can be implemented on any electronic device configured to receive and conduct voice calls. Such an electronic device may be, for example, a cellular telephone, smartphone, desktop computer, laptop computer, personal digital assistant (PDA), music player, handheld computer, tablet computer, kiosk, game system, television, or the like. Such a device may initiate and/or receive electronic communications in any of a number of modes, such as voice, text, email, instant message, chat, video chat, and the like. Communications may be implemented via any suitable communications network and according to any known communications protocol. Examples include the Internet, cellular telephone networks, EDGE, 3G, 4G, long term evolution (LTE), Session Initiation Protocol (SIP), Short Message Peer-to-Peer protocol (SMPP), SS7, Wi-Fi, Bluetooth, Hypertext Transfer Protocol (HTTP), Secure Hypertext Transfer Protocol (SHTTP), Transmission Control Protocol/Internet Protocol (TCP/IP), Apple Push Notification Service (APNS), Google Cloud Messaging (GCM), and/or the like, and/or any combination thereof. Communications may be secured, if appropriate, using any known security techniques such as, for example, a Virtual Private Network (VPN). Although the techniques are generally described herein in terms of voice calls received on a wireless telephone such as a smartphone via a wireless cellular telephone network, one skilled in the art will recognize that such techniques are applicable in other contexts as well.

In at least one embodiment, the techniques described herein include communication between a user's mobile device and a central server. Any suitable data transmission protocol can be used for such transmission, including any of the mechanisms mentioned above.

Although various aspects of the system are described herein in connection with an implementation on a smartphone, one skilled in the art will recognize that the techniques described herein can be implemented in other contexts, and indeed in any suitable device or service that enables electronic communication, whether by voice or by other means. Accordingly, the following description is intended to illustrate various embodiments by way of example, rather than to limit scope.

In one embodiment, the system is implemented, at least in part, as software running on a communications device. Such software can be in the form of an application (or "app") that can be downloaded (or otherwise obtained) and installed on the device. Alternatively, the functionality described herein can be included in software that is bundled with the device, such as operating system software, or delivered as a service to a device running a browser.

Figure 1:
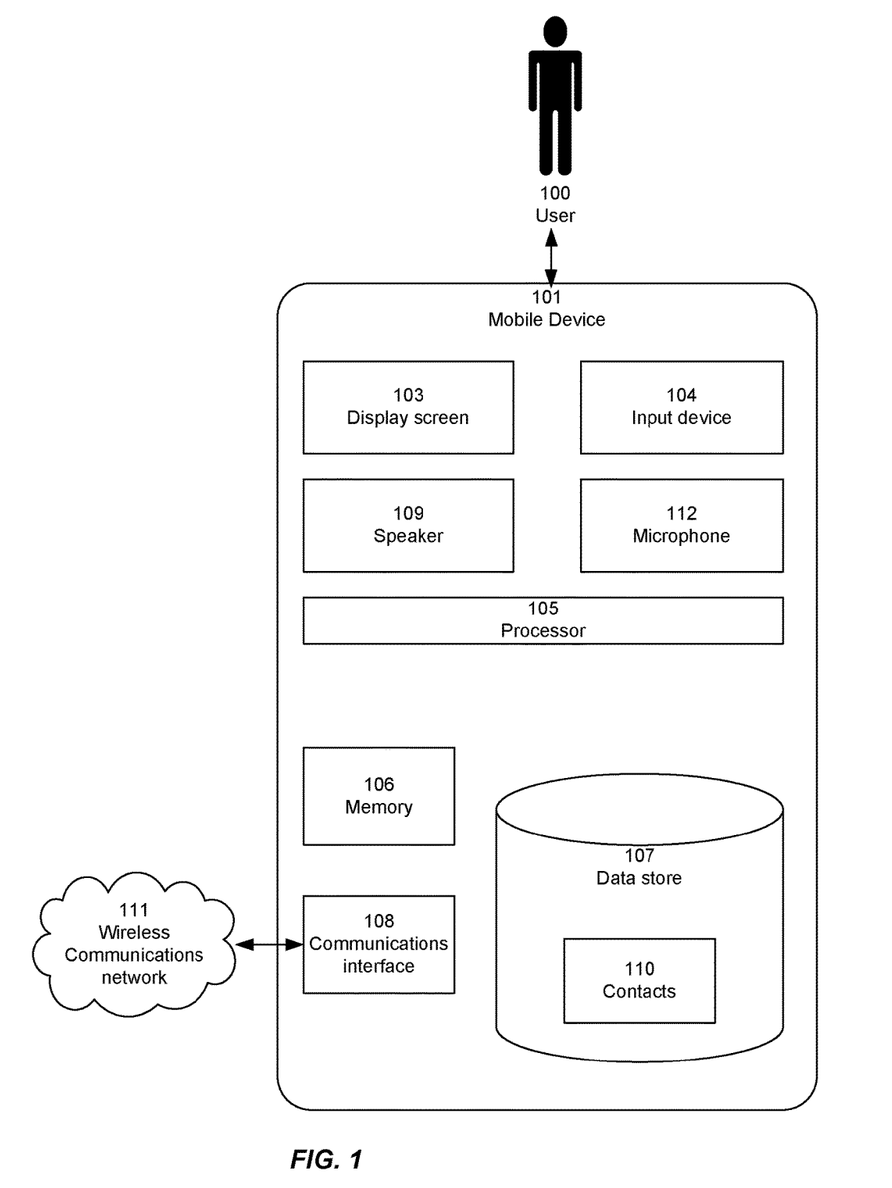
FIG. 1 is a block diagram depicting a hardware architecture for a mobile device for receiving and handling calls on an alternate number according to one embodiment.

Referring now to FIG. 1, there is shown a block diagram depicting a hardware architecture for a mobile device for receiving and handling calls on an alternate number according to one embodiment. Such an architecture can be used, for example, for implementing the techniques described herein in connection with a smartphone or other communications device, referred to herein as "mobile device 101" (or simple "device 101"). Device 101 may be any electronic device capable of initiating and/or receive voice calls; for example, smartphone, desktop computer, laptop computer, personal digital assistant (PDA), music player, handheld computer, tablet computer, kiosk, game system, television, or the like. In one embodiment, device 101 operates under the direction and control of user 100.

In one embodiment, device 101 is an iPhone, available from Apple Inc. of Cupertino, Calif., running an operating system such as iOS, also available from Apple Inc. of Cupertino, Calif. In other embodiments, device 101 may be based on the Android operating system, and is made by one of a large number of manufacturers including HTC, Samsung, Motorola, and Google. In yet other embodiments, device 101 may be based on the Blackberry operating system, Windows, or any other operating system known in the art of mobile devices.

In one embodiment, device 101 includes a number of hardware components that are well known to those skilled in the art. Input device 104 can be a keyboard, mouse, touchscreen, trackball, trackpad, five-way switch, voice input device, joystick, and/or any combination thereof. In embodiments wherein input device 104 is a touchscreen, a virtual keyboard and/or other input elements can be displayed thereon, according to known techniques. Display screen 103 is also provided, for displaying the user interface elements described herein, including communication buttons and other features. Microphone 112 and speaker 109 can be used for handling voice communication and providing alerts and/or notifications. Device 101 can also include other input and/or output device(s) (not shown), such as a camera(s), button(s), servomotor (for enabling vibrate alerts), and the like. Device 101 can be controlled in various ways, including voice control, according to well-known means. Device 101 can also include haptic output device (not shown) for providing feedback and output to user 100 via vibration or other similar techniques.

Processor 105 can be a conventional microprocessor for performing operations on data under the direction of software, according to well-known techniques. Memory 106 can be random-access memory having a structure and architecture as are known in the art, for use by processor 105 in the course of running software. Communications interface 108 may include any software and/or hardware for enabling communications via wireless communications network 111. Wireless communications network 111 may be a cellular network, a Wi-Fi network, and/or any other network known in the art. Wireless communications network 111 may include or may be connected to the Internet. Interface 108 may include a radio, for example, for enabling transmission and reception of data and/or voice signals across a cellular telephone network or other wireless network.

Data store 107 can be any magnetic, optical, and/or electrical storage device for storage of data in digital form; examples include flash memory, magnetic hard drive, CD-ROM, and/or the like. In one embodiment, data store 107 stores information describing contacts 110, according to well known means. For example, data store 107 can include names, phone numbers, addresses, email addresses, and/or image (such as photos) for any number of individuals, companies, or other entities. In one embodiment, such information is stored in a database in data store 107.

Data store 107 may further include application data (not shown) related to the operation of one or more applications on device 101. Data store 107 may include executable files, additional data files accessed by application programs, and/or the like.

One skilled in the art will recognize that the particular arrangement of hardware elements shown in FIG. 1 is merely exemplary, and that the techniques described herein can be implemented using different hardware elements configured in any of a number of different ways. Thus, the particular architecture shown in FIG. 1 is merely illustrative and is not intended to limit scope in any way. In alternative embodiments, the system can be implemented in other ways. For example, the system can be implemented in a client/server environment in which some or all of the data is stored remotely at a server, and wherein user 100 interacts with a client device that in turn communicates with the server. As another example, the system can be implemented using a web-based application. In another embodiment, these functions can be implemented in a peer-to-peer fashion, where there is no server managing the communication. In this application, the term "system" may include hardware and/or software components.

Figure 2:
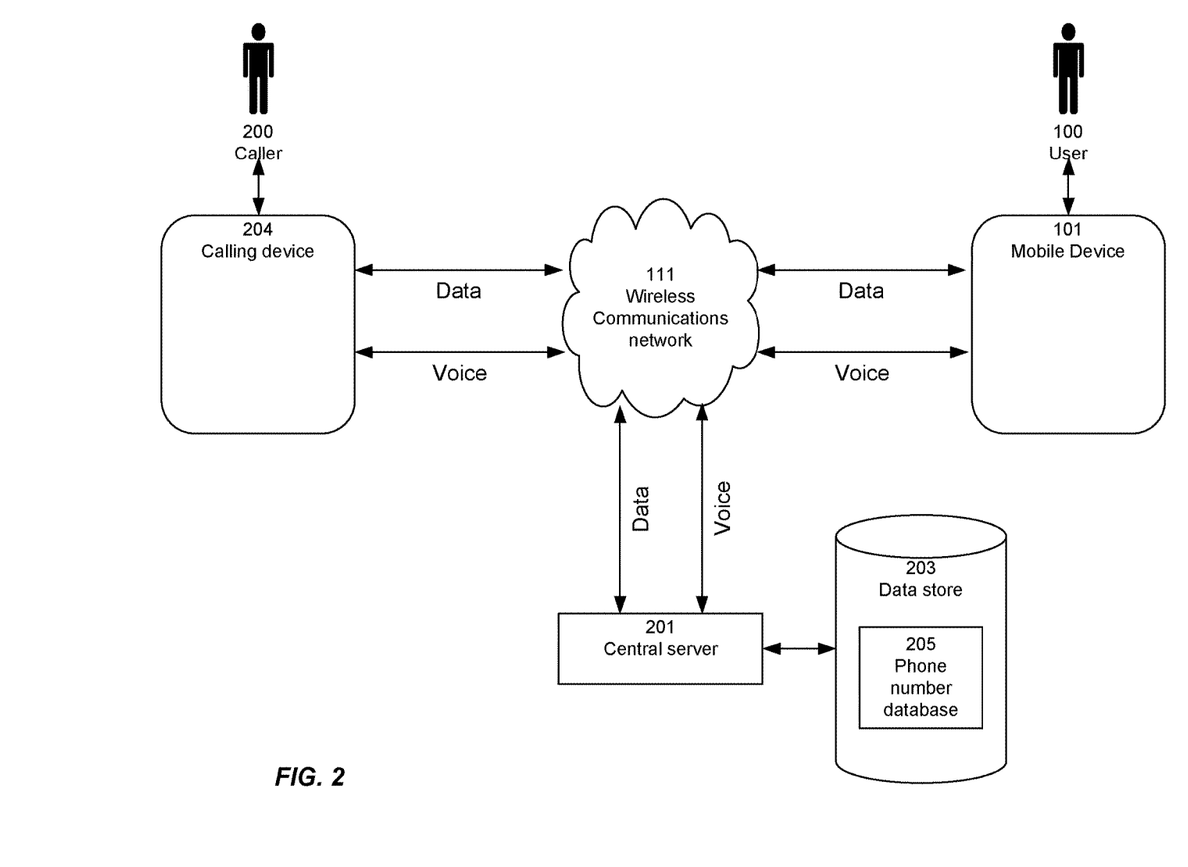
FIG. 2 is a block diagram depicting a system architecture for handling a declined call on an alternate number according to one embodiment.

Referring now to FIG. 2, there is shown is a block diagram depicting a system architecture for handling a declined call on an alternate number according to one embodiment. Mobile device 101, which may be configured as shown in FIG. 1 or may be configured in other ways, communicates via wireless communications network 111 to enable voice and/or data transmission to other components. Calling device 204, which may be a cellular telephone, smartphone, or other device, is also configured to communicate via wireless communications network 111. Thus, communications between device 204 and 101 can take place using known techniques for voice and/or data communications. For illustrative purposes, the techniques described herein are set forth in a context where the user of calling device 204 (referred to as caller 200) initiates a voice call intended for user 100, using an alternate number, and wherein user 100 declines the call.

In addition, central server 201 is configured to communicate via network 111. Central server 201 can be implemented as one or more computing devices, operating to receive requests for data and respond to such requests. Any suitable protocol can be used for communication with server 201 via network 111. In at least one embodiment, server 201 is able to make and/or receive voice calls, to forward voice calls, and to interact with an app running on mobile device 101, as described in more detail below. In at least one embodiment, server 201 is able to send messages to device 101 via a low power data channel, and is also able to forward voice calls to device 101 via a voice channel implemented on network 111.

Data store 203 contains information used by server 201 in implementing the techniques described herein. Any suitable communications mechanisms and/or protocols can be used to enable the transmission of requests and responses between server 201 and data store 203. In at least one embodiment, data store 203 contains phone number database 205, which stores records associating registered numbers with alternate numbers. Central server 201 requests and retrieves such information from data store 203 as needed, so as to determine how incoming calls should be handled and to whom they should be forwarded, as discussed in more detail below.

One skilled in the art will recognize that the architecture depicted in FIG. 2 is merely exemplary, and that the described system can be implemented using any other suitable architecture, and using fewer or more components than those depicted.

Method

According to various embodiments, the system and method described herein provide mechanisms for handling declined calls for an alternate phone number on a mobile device such as device 101.

In at least one embodiment, as described in the above-referenced related application, a registered number is associated with device 101. This may, for example, be the number that is assigned to device 101 by the wireless carrier. In addition, any number of alternate numbers are associated with the registered number. According to the techniques described herein, calls to those alternate numbers are forwarded to the registered number and thereby reach the same device 101. In at least one embodiment, phone number database 205 stored in data store 203 maintains associations between alternate numbers and registered numbers.

For illustrative purposes, the techniques described herein are set forth in a context where the user of calling device 204 (referred to as caller 200) initiates a voice call intended for user 100, using an alternate number associated with user 100, and wherein user 100 declines the call.

In at least one embodiment, the techniques described herein are implemented using an app installed on device 101. Voice calls to alternate numbers are received at server 201 and forwarded to device 101; when forwarded, such calls are configured so that they appear to come from a "pilot number" associated with central server 201.

In at least one embodiment, just prior to forwarding a call to device 101, central server 201 sends a message causing the app installed on device 101 to be activated (i.e., to "wake up"). Once the app has been activated, it is able to use APIs to monitor state and/or behavior of user 100. In particular, if user 100 declines the call, the app is able to handle the declined call appropriately, for example by directing the declined call to a voicemail system associated with the alternate number.

Incoming calls to the registered number associated with device 101 are handled normally; if declined, such calls are handled according to native functionality on device 101, such as being directed to native voicemail system associated with the wireless carrier for device 101.

Figure 3:
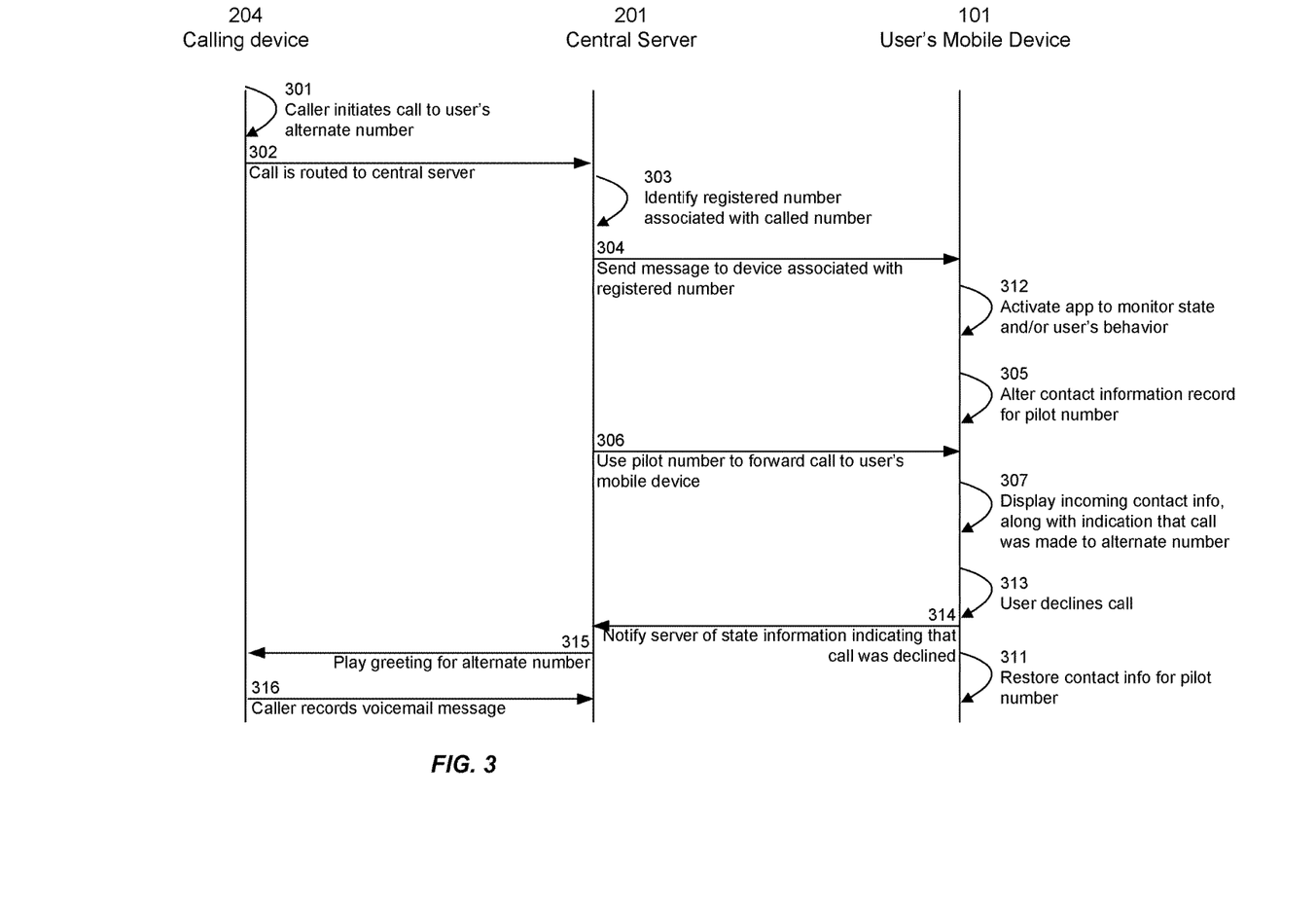
FIG. 3 is an event trace diagram depicting a method for handling a declined call on an alternate number according to one embodiment.

Referring now to FIG. 3, there is shown an event trace diagram depicting a method for handling a declined call on an alternate number associated with user 100 (or with device 101) according to one embodiment. One skilled in the art will recognize that the steps depicted in FIG. 3, and the components that perform the steps, are merely exemplary. Thus, for example, different components can perform the depicted steps and/or other steps, and/or the steps can be performed in a different order than is depicted.

In step 301, caller 200 (using a device such as calling device 204) initiates a voice call to an alternate number associated with user 100 (or with device 101). In step 302, such a call is automatically routed to central server 201. In at least one embodiment, all alternate numbers are associated with a provider of the service described herein. Thus, when caller 200 calls an alternate number, the Public Switched Telephone Network (PSTN) routes the call to central server 201 of the provider. In step 303, upon receiving such a call, central server 201 consults phone number database 205 in data store 203 to identify which registered number is associated with the called alternate number.

In step 304, central server 201 sends a message to device 101, based on a determination that the identified registered number is associated with device 101. The message can be, for example, a push notification or any other type of notification, and can be sent via any suitable mechanism, such as a data channel, Apple Push Notification Service (APNS), Google Cloud Messaging (GCM), SMS channel, or the like. The message alerts device 101 that a call is coming in. In at least one embodiment, the message also provides caller identification for calling device 204 and/or caller 200 (such as for example the registered telephone number associated with calling device 204). In at least one embodiment, the message also includes an indication of which alternate number was called. In at least one embodiment, the message can include the name of the caller, if such information has been stored at data store 203 or is otherwise accessible to server 201.

Upon receiving the message, in step 312, device 312 activates an app so that the current state and/or user's 100 behavior with respect to the incoming call can be monitored. By ensuring that the app is active in this manner, the system is able to use existing APIs so as to be able to detect activity such as user 100 declining a call, as described in more detail below.

For example, in at least one embodiment, the payload of the push notification received in the message of step 304 activates the app so that the app can run the APIs that allow device 101 to observe state and/or user's 100 behavior with respect to incoming calls, and thereby detect user's 100 activation of a decline button.

In at least one embodiment, step 312 involves beginning a background task for some period of time, such as 30 seconds or 45 seconds (referred to as an "observation window"), so as to ensure that app remains active for a sufficient time period to be able to detect state and/or user's 100 behavior with respect to the incoming call on the alternate number. In at least one embodiment, the app calls a routine that causes an acknowledgement message to be sent to server 201, informing server 201 that the app is ready to receive the call. The acknowledgement message can include a flag to indicate that the app is monitoring for state changes. This also ensures that server 201 can set up a redirect for the voicemail system associated with the alternate number, in case the call is declined.

In at least one embodiment, after the specified period of time, the task may return to a suspended state.

In at least one embodiment, if multiple incoming calls occur within the same observation window, the system can use additional techniques to identify a call precisely, for example using additional data received in the push notification. For some mobile operating systems, such as Android, calls can be precisely identified and matched within the observation window. However, for other mobile operating system, such as iOS, limitations may exist wherein the native API for monitoring the incoming call may not provide detailed caller identification for an incoming call. Accordingly, in at least one embodiment, other techniques can be used to match the ringing calls to the expected calls within the observation window. The following are example of scenarios and approaches for handling situations in which multiple calls ring on the device within the observation window:

If two calls to the alternate number ring on device 101, the calls are matched (if possible) based on the timestamps of their respective notification messages. Thus, the call that rings first is matched to the call whose notification message arrived first. The state changes of these calls are reported to server 201 as described herein.

If a call to the alternate number rings ahead of a call to the native number, the call to the alternate number is matched to its notification message, and its state changes are reported to server 201 as described herein.

If a call to the native number rings ahead of a call to the alternate number, the call to the native number will be matched to the alternate call and its state changes will be reported to server 201 (instead of the call to the alternate number). In such a situation, if user 100 declines the call, the call will be handled by carrier's voicemail as usual. However, the following call to the alternate number may be transferred to the voicemail system, and user 100 may not have chance to pick up.

In at least one embodiment, in step 305, device 101 alters the contact record stored in data store 107 for the pilot number, so that fields and/or images in the contact record for the pilot number indicate the use of an alternate number, and further indicate the identity of caller 200. For example, a name field can be changed to indicate the name of caller 200 (or a combination of the name of caller 200 and an indication of the fact that the call was made to an alternate number). The name can be extracted from a contact record 110 in data store 107 at device 101, or it may have been received by device 101 as part of the message that was sent in step 304.

Alternatively or additionally, the name field can be changed to include a brand name associated with the feature that facilitates calls to alternate numbers. Alternatively or additionally, a phone number field can be changed to indicate the phone number of caller 200 (or a combination of the phone number of caller 200 and an indication of the fact that the call was made to an alternate number).

Alternatively or additionally, a caller image can be changed to that of caller 200. Alternatively or additionally, the image or some portion of it (such as a background) can be changed to include a brand name, logo, distinctive color, and/or the like, associated with the feature that facilitates calls to alternate numbers. For example, in at least one embodiment, the caller image can be changed so that a distinctive background color is shown when calls are received at an alternate number.

Figure 4:
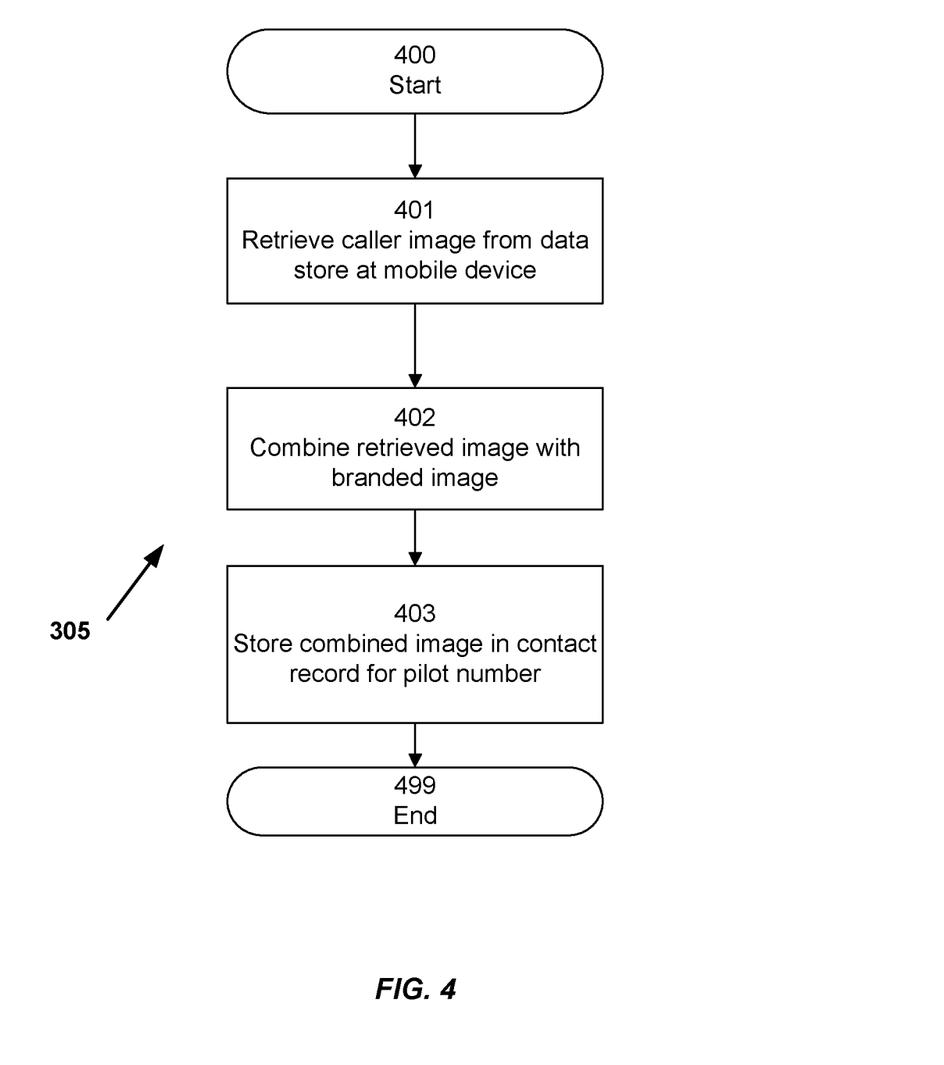
FIG. 4 is a flow diagram depicting a method of altering an image in a contact information record for a pilot number, according to one embodiment.

Referring now also to FIG. 4, there is shown a flow diagram depicting additional details for step 305, according to one embodiment. In step 401, device 101 retrieves an image (such as a photograph) associated with the caller; this image can be retrieved, for example, from a contact record 110 stored at data store 107 of device 101. In step 402, the retrieved image is combined with a branded image, such as logo, product name, or company name associated with the functionality for providing alternate phone numbers. In step 403, this combined image is stored in the contact record 110 for the pilot number associated with server 201.

One skilled in the art will recognize that the method depicted in FIG. 4. Other techniques can be used for combining stored information about the caller with a branded image, text, or other element that indicates that the call was placed to an alternate number. For example, in at least one embodiment, a text based identifier of the caller can be combined with a text-based indicator indicating a product name, or company name associated with the functionality for providing alternate phone numbers.

Referring again to FIG. 3, once step 305 is completed, in step 306, central server 201 forwards the voice call to device 101, using the pilot number associated with server 201 as the originating caller identifier. The call is placed using the normal wireless voice network, so that the native voice call functionality of device 101 receives and handles the call. In this manner, device 101 does not have to use wireless data or rely on WiFi, to receive a call at an alternate number.

In step 307, device 101 displays information for the incoming call. Since the call appears to be coming from the pilot number associated with server 201, the native voice call functionality of device 101 displays incoming contact information for the pilot number. Since the contact record for the pilot number has been altered (in step 305), the displayed contact information includes an indication of the actual caller's identity (or at least the phone number of calling device 204), and can also include an indication that the call was made to an alternate number (by displaying text to that effect, and/or a logo, color, and/or the like). In at least one embodiment, this display of actual caller identity along with identification that the call was made to an alternate number, and an indication of which alternate number was used (if there are more than one), is made possible by the dynamic altering of contact information in step 305, in response to the message received in step 304 for central server 201.

For example, the displayed contact information may show an image or name of the caller, along with a branded icon or text showing that the call was initiated to an alternate number rather than to the registered number for device 101. If more than one alternate number is associated with device 101, the displayed contact information can specify which alternate number was used.

In addition, since the call is handled by the native voice calling functionality of device 101, any other distinctive output can be presented for calls to the pilot number. For example, device 101 can be configured so that a distinctive ring tone or vibration is output for all calls coming from the pilot number. Since all calls to alternate numbers appear to come from the pilot number, the distinctive ring tone or vibration would be used whenever a call placed to an alternate number is received at device 100. In this manner, the native voice calling functionality of device 100 can be used to further alert user 101 that a call was placed to an alternate number.

At this point, the app running on device 101 is monitoring for state changes so as to be able to determine user 100 behavior with respect to the incoming call. In at least one embodiment, the app calls a web service on server 201 for each detected state change, as described in more detail below. In step 313, the app detects a series of state changes that indicates that user 100 has declined the incoming call, for example by tapping a "decline" button, or by ignoring the call for some period of time (or for some number of rings), or by performing some other action.

Upon detection of state changes that indicate that the call was declined (or may have been declined), and using one or more APIs running at device 101, the app causes a message to be sent 314 to server 201 to notify server 201 that the call was (or may have been) declined. In at least one embodiment, device 101 sends state change information to server 201, and server 201 makes the determination as to whether the state change information indicates that the call was declined.

Server 201 can then ensure that the declined call does not go to the native voicemail system, but is instead handled in a manner specified for declined calls to the alternate number.

For example, as depicted in FIG. 3, a greeting can be played 315 that is associated with the alternate number. Caller 200 can then record a voicemail message, which is stored at server 201, associated with the alternate number, and can be retrieved and played by user 101 as desired. Alternatively, any other suitable handling can take place in response to detection of the call being declined.

In at least one embodiment, in step 311, once the call has been declined, device 101 automatically restores the contact information for the pilot number to its previous state. This step can be omitted, if desired, since the contact record can simply remain as is until it is altered again the next time a call comes in to an alternate number.

In at least one embodiment, changes to the contact records on the device 101 are performed automatically by the app installed on device 101. As described above, in at least one embodiment, such changes are performed in response to receiving the message (in step 304) from server 201 that a call is coming in, and also (in step 311) after an incoming call has been declined (so as to restore the previous state of the contact record).

If, instead of declining the call in step 313, user 100 accepts the call, a normal voice connection is established between device 101 and device 204, as described in more detail in the above-referenced related application.

Detection of State

In at least one embodiment, while active, the app running on device 101 can detect the following states:
IDLE (disconnected; device 101 is not in use);
RINGING (device 101 is ringing for an incoming call);
ANSWERED (connected/call answered).

Figure 5A:
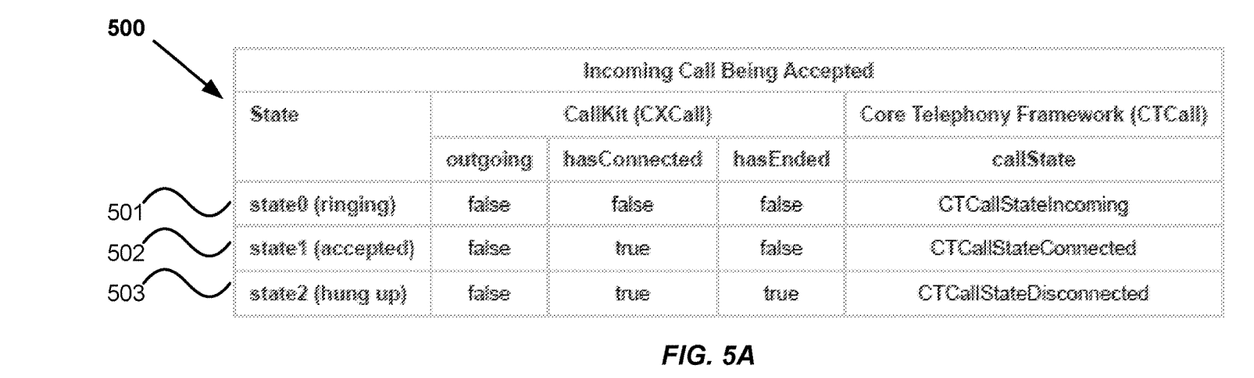
FIG. 5A is a table depicting examples of state changes that take place when an incoming call is accepted, using APIs available for the iOS operating system.

Referring now to FIG. 5A, there is shown a table 500 depicting examples of state changes that take place when an incoming call is accepted, as can be detected via APIs available for the iOS operating system. Row 501 shows the state when the incoming call is ringing. Row 502 shows the state when the call has been accepted. Row 503 shows the state when the incoming call has been terminated (one of the parties has hung up).

Figure 5B:
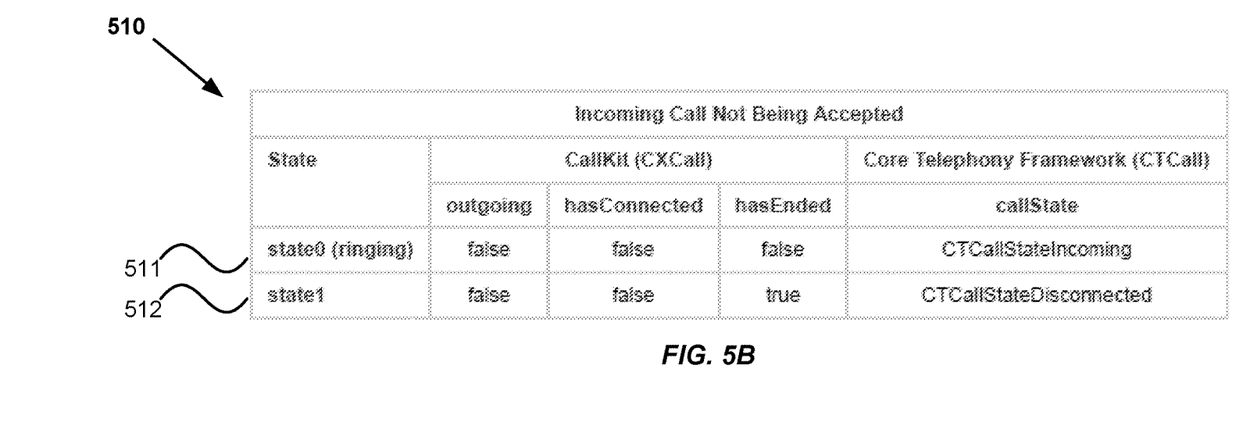
FIG. 5B is a table depicting examples of state changes that take place when an incoming call is not accepted, using APIs available for the iOS operating system.

Referring now to FIG. 5B, there is shown a table 510 depicting examples of state changes that take place when an incoming call is not accepted, as can be detected via APIs available for the iOS operating system. Row 511 shows the state when the incoming call is ringing. Row 512 shows the state when the call has been declined (or is otherwise not accepted). Normally, after state1, shown in row 512, the call is directed to the native voicemail system. However, if the app is actively monitoring user's 100 behavior, the state change sequences shown in FIG. 5B can be detected for an incoming call on the alternate number, before the call is directed to the native voicemail system. At that point, the app may notify 314 server 201 that the call has been declined, and server 201 can properly direct the call to the voicemail system for the alternate number, as described above.

Figure 6:
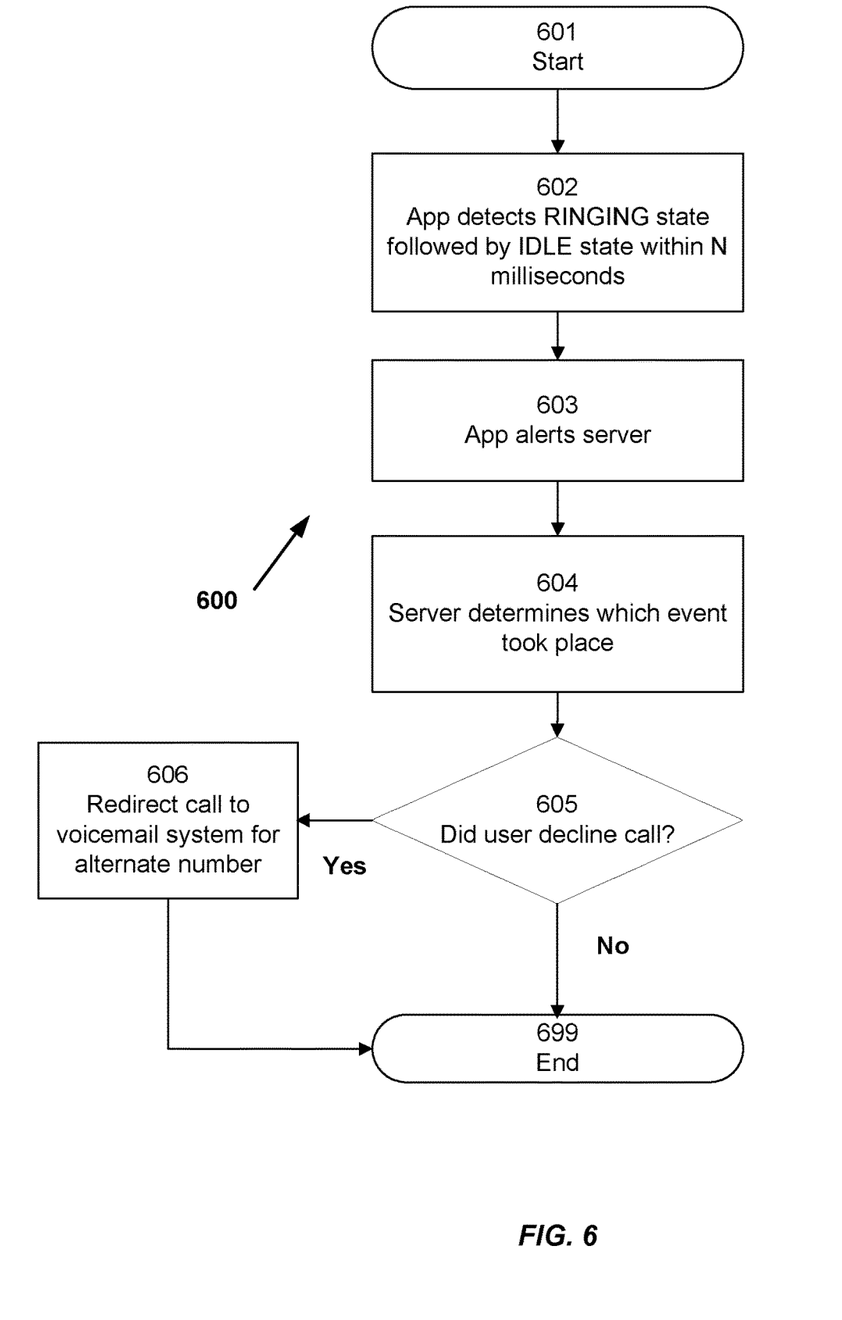
FIG. 6 is a flow chart depicting an example of a method for determining whether a call was declined, according to one embodiment.

As described above, in at least one embodiment, the app running on device 101 can send a message to server 201 whenever a state change is detected. Referring now to FIG. 6, there is shown a flow chart depicting an example of a method 600 for determining whether a call was declined, according to one embodiment. Once the method begins 601, the app detects 602 a RINGING state followed by an IDLE state within some time period after the call is answered (e.g. N milliseconds). N can be configurable to indicate some appropriate amount of time to determine how the call should be properly handled. It can be specified as a static parameter, or it can be varied dynamically based on network conditions, carrier, and/or other factors.

The example of FIG. 6 corresponds to table 510 of FIG. 5B. The RINGING state followed by an IDLE state indicates that either 1) user 100 declined the call (by pressing "decline" or performing some other action), or 2) caller 200 hung up, or 3) the call has already been redirected to the voicemail system for alternate numbers. Since, in at least one embodiment, the app does not know which of these cases has taken place, it alerts 603 server 201 of the RINGING to IDLE transition. Server 201 then determines 604 which of the above-listed cases has taken place. If it is case 2) or 3), then no further action is needed. If it is case 1) (user 100 declined the call 605), then server 201 immediately redirects 606 the call to the voicemail system for the alternate number. In other embodiments, some other appropriate action can be taken when it is determined that the user has declined the call.

In at least one embodiment, determination 604 as to which case has taken place can be performed as follows. Every call to an alternate number forwarded by server 201 has a unique identifier. The app running on device 101 monitors and reports state changes for an incoming call with that particular identifier, allowing server 201 to track the state transitions of an incoming call, and uses the logic discussed above to determine whether the call was answered or declined.

If the app detects a RINGING state followed by an ANSWERED state, it informs server 201 that the call was answered. As described in the above-referenced related application, the call has been connected using native telephone functionality of device 101.

Exceptions and Variations

Ringing to Idle Transition not Detected

In at least one embodiment, if the app is activated but no transition is detected from RINGING to IDLE within the N-second time period, then there is no indication that the call has been declined. If the call is not answered, then this means the call went to the native voicemail system. In at least one embodiment, such occurrences are logged, so that the value of N can be adjusted accordingly for future calls.

No Network Connection

The above-described mechanism assumes that some type of network connection is available to facilitate transmittal of the message in step 304, so that the app on device 101 can be activated in step 312. In at least one alternative embodiment, where no network connection is available, calls to an alternate number can still be properly handled using an API such as the APNs Provider API offered in the iOS operating system from Apple Inc. of Cupertino, Calif. This API provides instant feedback with JavaScript Object Notation (JSON) response data indicating variable status of the acceptance of APNS push notifications. For example, status 200 indicates that a push notification has been successfully accepted by an APNS server. If non-success is detected, the system knows that incoming caller ID detection will not occur; in such cases, a press-to-accept (PTA) call can be forwarded so that the declined call can be handled appropriately.

Alternatively, another technique can be used. For example, in at least one embodiment, when the app receives a push notification such as the message of step 304, it notifies server 201 by calling a routine such as log/pushNotification/received. If no call to this web service is detected within some period of time, such as 4 seconds, the system assumes that either the message of step 304 was not delivered to device 101, perhaps because no network connection is available. In such cases, a press-to-accept (PTA) call can be forwarded so that the declined call can be handled appropriately.

When no network connection is available on device 101, or when device 101 is powered off, the data channel is off. As a consequence, server 201 cannot receive a report from device 101 about the delivery status of the notification message regarding a call to an alternate number.

When server 201 fails to receive the delivery report within a specified period of time (such as, for example, 4 seconds), it may decide to forward the call as a press-to-accept (PTA) call to device 101. A PTA call provides an automated voice prompt asking user 100 to press a button before the call is actually connected. If user 100 declines or ignores the PTA call, server 201 redirects the call to the voicemail system associated with the alternate number.

In some cases, the native call screen for device 101 may not be displayed, even though network connection and VoIP push are available. This may occur, for example, in certain modes such as airplane mode (without wifi calling) or do-not-disturb mode, or if the device is powered off, or if the call is blocked by the native phone app or call directory extensions. In such a case the app receives the message of step 304 and is activated. APNS messages are still delivered to device 101, although device 101 may not receive incoming call state changes. The app can detect whether airplane mode is on (meaning that calls cannot be received, unless wifi calling is on), and can send a message to server 201 to cause incoming calls to be routed to the voicemail system for the alternate number.

If a do-not-disturb mode is active, the app can detect this and notify server 201 to send calls to the voicemail system for the alternate number. If a call is blocked, the app can detect this and notify server 201 to try placing the call using a different (hopefully unblocked) incoming pilot number. In cases where the system cannot detect whether a call did not ring because of do-not-disturb or a blocked call, the system can try a different incoming pilot number first, and then, if that fails, switch to the voicemail system for the alternate number.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may be a general-purpose computing device selectively activated or reconfigured by a computer program stored therein and/or in other components. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the devices referred to herein may include a single processor or may be architectures employing multiple processor designs for increased computing capability. Further, any reference herein to a "device" can alternatively refer to one or more internal subsets of devices.

The algorithms and displays presented herein are not inherently related to any particular device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

In at least one embodiment, the system may be implemented using any suitable computing platform, whether wired or wireless, and whether stationary or mobile: examples include smartphones, tablet computers, laptop computers, desktop computers, and the like. For example, the system can be implemented on iOS devices such as the iPod, iPad, or iPhone, on any suitable Android devices, on a Windows-based device, or on a device with the Blackberry operating system.

Accordingly, various embodiments include software, hardware, and/or other elements for operation using a smartphone, computer system, computing device, or other electronic device, or any combination or plurality thereof. Such an electronic device can include, for example, a processor, an input device (such as a keyboard, mouse, touchpad, touchscreen, track pad, joystick, trackball, microphone, and/ or any combination thereof), an output device (such as a screen, touchscreen, speaker, haptic output device, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for handling a declined voice call to an alternate telephone number, comprising, at a device having native voice call functionality:

receiving a message indicating that a voice call has been made from a caller to an alternate telephone number associated with the device;
responsive to receiving the message, automatically initiating monitoring for a change in device state that is detectable without monitoring user input, wherein the monitored device state comprises at least one selected from the group consisting of:
an idle state;
a ringing state; and
an answered state;
subsequent to receiving the message, receiving a voice call forwarded to the device via a server;
based on the monitored device state, automatically determining whether a user of the device has declined the voice call; and
responsive to a determination that the user has declined the voice call, automatically performing a call handling function distinct from transferring the call to a native voicemail system associated with a primary number for the device.

2. The computer-implemented method of claim 1, wherein automatically performing a call handling function comprises causing a server to redirect the call to a voicemail system distinct from the native voicemail system.

3. The computer-implemented method of claim 1, wherein automatically performing a call handling function comprises causing a server to redirect the call to a voicemail system associated with the alternate telephone number.

4. The computer-implemented method of claim 1, further comprising, responsive to the user accepting the call, establishing a voice connection to proceed with the voice call.

5. The computer-implemented method of claim 4, wherein establishing a voice connection to proceed with the voice call comprises establishing a voice connection between the caller and the device using the native voice calling functionality of the device.

6. The computer-implemented method of claim 1, wherein receiving a message comprises receiving a push notification.

7. The computer-implemented method of claim 1, wherein the device comprises a mobile device.

8. The computer-implemented method of claim 1, wherein the device comprises a wireless phone.

9. A computer-implemented method for handling a declined voice call to an alternate telephone number, comprising:

at a server, receiving a call made from a caller to a telephone number;
at a processor associated with the server, identifying the called number as an alternate number associated with a device having native voice call functionality;
at the processor, identifying a registered number associated with the called alternate number;
transmitting a message from the server to the device associated with the alternate number, the message comprising an indication of the called alternate number, so as to initiate monitoring for a change in device state that is detectable without monitoring user input at the device, wherein the monitored device state comprises at least one selected from the group consisting of:
an idle state;
a ringing state; and
an answered state;
subsequent to transmitting the message, forwarding the call to the device associated with the alternate number; and responsive to receiving an indication of device state indicating that the call was declined, performing a call handling function distinct from transferring the call to a native voicemail system associated with a primary number for the device.

10. The computer-implemented method of claim 9, wherein automatically performing a call handling function comprises redirecting the call to a voicemail system distinct from the native voicemail system.

11. The computer-implemented method of claim 9, wherein automatically performing a call handling function comprises redirecting the call to a voicemail system associated with the alternate telephone number.

12. The computer-implemented method of claim 9, further comprising, responsive to the user accepting the call, establishing a voice connection to proceed with the voice call.

13. The computer-implemented method of claim 9, wherein transmitting a message comprises transmitting a push notification.

14. The computer-implemented method of claim 9, wherein the device comprises a mobile device.

15. The computer-implemented method of claim 9, wherein the device comprises a wireless phone.

16. A non-transitory computer-readable medium for handling a declined voice call to an alternate telephone number, comprising instructions stored thereon, that when executed by a processor on a device having native voice call functionality, perform the steps of:
   receiving a message indicating that a voice call has been made from a caller to an alternate telephone number associated with the device;
   responsive to receiving the message, automatically initiating monitoring for a change in device state that is detectable without monitoring user input, wherein the monitored device state comprises at least one selected from the group consisting of:
      an idle state;
      a ringing state; and
      an answered state;
   subsequent to receiving the message, receiving a voice call forwarded to the device via a server;
   based on the monitored device state, automatically determining whether a user of the device has declined the voice call; and
   responsive to a determination that the user has declined the voice call, automatically performing a call handling function distinct from transferring the call to a native voicemail system associated with a primary number for the device.

17. The non-transitory computer-readable medium of claim 16, wherein automatically performing a call handling function comprises causing a server to redirect the call to a voicemail system distinct from the native voicemail system.

18. The non-transitory computer-readable medium of claim 16, wherein automatically performing a call handling function comprises causing a server to redirect the call to a voicemail system associated with the alternate telephone number.

19. The non-transitory computer-readable medium of claim 16, further comprising, responsive to the user accepting the call, establishing a voice connection to proceed with the voice call.

20. The non-transitory computer-readable medium of claim 19, wherein establishing a voice connection to proceed with the voice call comprises establishing a voice connection between the caller and the device using the native voice calling functionality of the device.

21. The non-transitory computer-readable medium of claim 16, wherein receiving a message comprises receiving a push notification.

22. The non-transitory computer-readable medium of claim 16, wherein the device comprises a mobile device.

23. The non-transitory computer-readable medium of claim 16, wherein the device comprises a wireless phone.

24. A non-transitory computer-readable medium for handling a declined voice call to an alternate telephone number, comprising instructions stored thereon, that when executed by a processor on a server, perform the steps of:
   receiving a call made from a caller to a telephone number;
   identifying the called number as an alternate number associated with a device having native voice call functionality;
   identifying a registered number associated with the called alternate number;
   causing a message to be transmitted from the server to the device associated with the alternate number, the message comprising an indication of the called alternate number, so as to initiate monitoring for a change in device state that is detectable without monitoring user input at the device, wherein the monitored device state comprises at least one selected from the group consisting of:
      an idle state;
      a ringing state; and
      an answered state;
   subsequent to transmitting the message, causing the call to be forwarded to the device associated with the alternate number; and
   responsive to receiving an indication of device state indicating that the call was declined, performing a call handling function distinct from transferring the call to a native voicemail system associated with a primary number for the device.

25. The non-transitory computer-readable medium of claim 24, wherein automatically performing a call handling function comprises redirecting the call to a voicemail system distinct from the native voicemail system.

26. The non-transitory computer-readable medium of claim 24, wherein automatically performing a call handling function comprises redirecting the call to a voicemail system associated with the alternate telephone number.

27. The non-transitory computer-readable medium of claim 24, further comprising, responsive to the user accepting the call, establishing a voice connection to proceed with the voice call.

28. The non-transitory computer-readable medium of claim 24, wherein transmitting a message comprises transmitting a push notification.

29. The non-transitory computer-readable medium of claim 24, wherein the device comprises a mobile device.

30. The non-transitory computer-readable medium of claim 24, wherein the device comprises a wireless phone.

31. A system for handling a declined voice call to an alternate telephone number at a device having native voice call functionality, comprising:
   a communications interface, configured to receive a message indicating that a voice call has been made from a caller to an alternate telephone number associated with the device;
   a processor, communicatively coupled to the communications interface, configured to, responsive to receiving the message, automatically initiate monitoring for a change in device state that is detectable without monitoring user input, wherein the monitored device state comprises at least one selected from the group consisting of:
an idle state;
a ringing state; and
an answered state; and
a voice communication component, communicatively coupled to the processor, configured to, subsequent to receiving the message, receive a voice call forwarded to the device via a server;
wherein the processor is further configured to:
based on the monitored device state, automatically determine whether a user of the device has declined the voice call; and
responsive to a determination that the user has declined the voice call, automatically performing a call handling function distinct from transferring the call to a native voicemail system associated with a primary number for the device.

32. The system of claim 31, wherein automatically performing a call handling function comprises causing a server to redirect the call to a voicemail system distinct from the native voicemail system.

33. The system of claim 31, wherein automatically performing a call handling function comprises causing a server to redirect the call to a voicemail system associated with the alternate telephone number.

34. The system of claim 31, wherein the voice communication component is further configured to, responsive to the user accepting the call, establish a voice connection to proceed with the voice call.

35. The system of claim 34, wherein establishing a voice connection to proceed with the voice call comprises establishing a voice connection between the caller and the device using the native voice calling functionality of the device.

36. The system of claim 31, wherein receiving a message comprises receiving a push notification.

37. The system of claim 31, wherein the device comprises a mobile device.

38. The system of claim 31, wherein the device comprises a wireless phone.

39. At a server, a system for handling a declined voice call to an alternate telephone number, comprising:
a voice call component, configured to receive a call made from a caller to a telephone number;
a processor, communicatively coupled to the voice call component, configured to:
identify the called number as an alternate number associated with a device having native voice call functionality; and
identify a registered number associated with the called alternate number; and
a communications interface, communicatively coupled to the processor, configured to transmit a message from the server to the device associated with the alternate number, the message comprising an indication of the called alternate number, so as to initiate monitoring for a change in device state that is detectable without monitoring user input at the device, wherein the monitored device state comprises at least one selected from the group consisting of:
an idle state;
a ringing state; and
an answered state;
wherein the voice call component is configured to, subsequent to transmitting the message, forward the call to the device associated with the alternate number;
and wherein the processor is further configured to, responsive to receiving an indication of device state indicating that the call was declined, perform a call handling function distinct from transferring the call to a native voicemail system associated with a primary number for the device.

40. The system of claim 39, wherein automatically performing a call handling function comprises redirecting the call to a voicemail system distinct from the native voicemail system.

41. The system of claim 39, wherein automatically performing a call handling function comprises redirecting the call to a voicemail system associated with the alternate telephone number.

42. The system of claim 39, wherein the voice communication component is further configured to, responsive to the user accepting the call, establish a voice connection to proceed with the voice call.

43. The system of claim 39, wherein transmitting a message comprises transmitting a push notification.

44. The system of claim 39, wherein the device comprises a mobile device.

45. The system of claim 39, wherein the device comprises a wireless phone.

46. The method of claim 1, wherein receiving a voice call forwarded to the device via a server comprises receiving a voice call originating from a telephone number associated with the server.

47. The method of claim 1, wherein automatically determining whether a user of the device has declined the voice call comprises detecting a ringing state followed by an idle state.

48. The method of claim 9, wherein the indication of device state indicating that the call was declined comprises an indication of a ringing state followed by an idle state.

49. The non-transitory computer-readable medium of claim 16, wherein receiving a voice call forwarded to the device via a server comprises receiving a voice call originating from a telephone number associated with the server.

50. The non-transitory computer-readable medium of claim 16, wherein automatically determining whether a user of the device has declined the voice call comprises detecting a ringing state followed by an idle state.

51. The non-transitory computer-readable medium of claim 24, wherein the indication of device state indicating that the call was declined comprises an indication of a ringing state followed by an idle state.

52. The system of claim 31, wherein receiving a voice call forwarded to the device via a server comprises receiving a voice call originating from a telephone number associated with the server.

53. The system of claim 31, wherein automatically determining whether a user of the device has declined the voice call comprises detecting a ringing state followed by an idle state.

54. The system of claim 39, wherein the indication of device state indicating that the call was declined comprises an indication of a ringing state followed by an idle state.

* * * * *